May 12, 1953 G. K. JONES 2,638,151
SEAT FOR VEHICLES SUCH AS AIRCRAFT
Filed April 17, 1950 4 Sheets-Sheet 1

INVENTOR
Gordon K. Jones
BY
Sellers & Latta
-ATTORNEYS-

May 12, 1953
G. K. JONES
2,638,151
SEAT FOR VEHICLES SUCH AS AIRCRAFT
Filed April 17, 1950
4 Sheets-Sheet 2
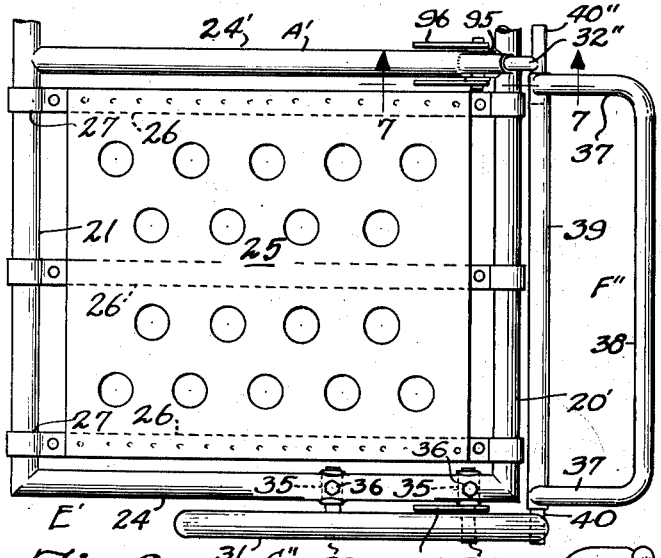
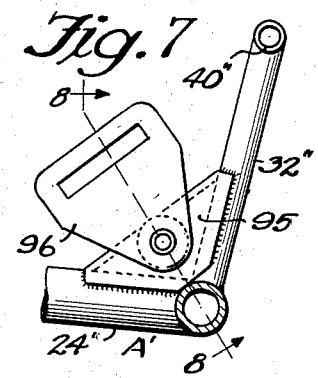
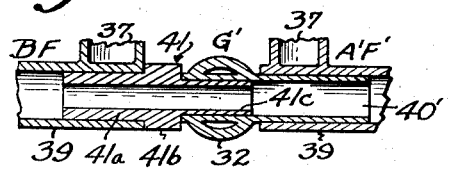
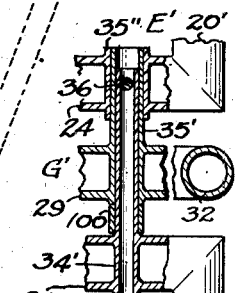
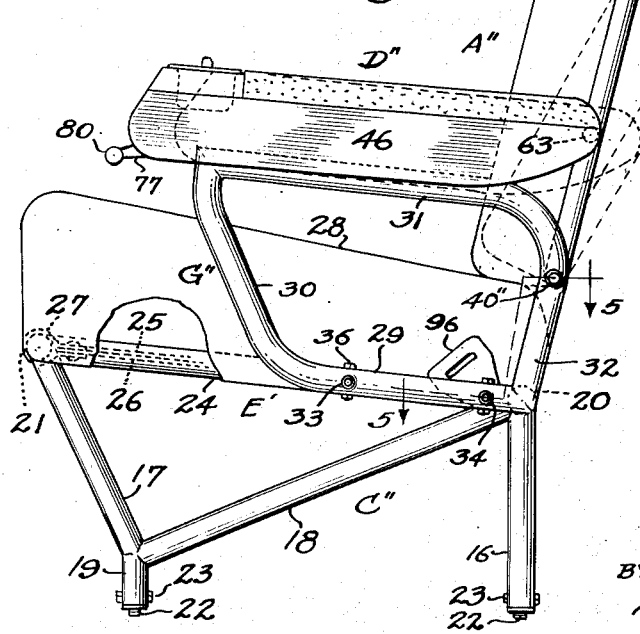
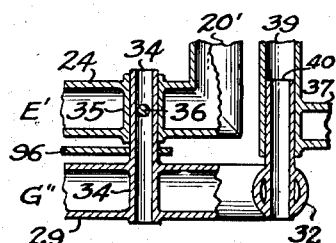
INVENTOR
GORDON K. JONES
BY Sellers and Latta
—ATTORNEYS—

May 12, 1953  G. K. JONES  2,638,151
SEAT FOR VEHICLES SUCH AS AIRCRAFT
Filed April 17, 1950  4 Sheets-Sheet 3
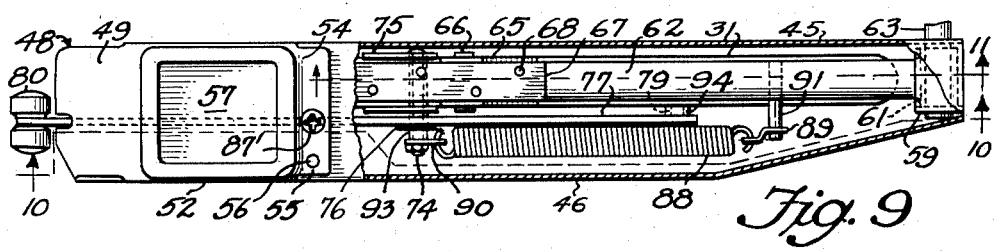
Fig. 9
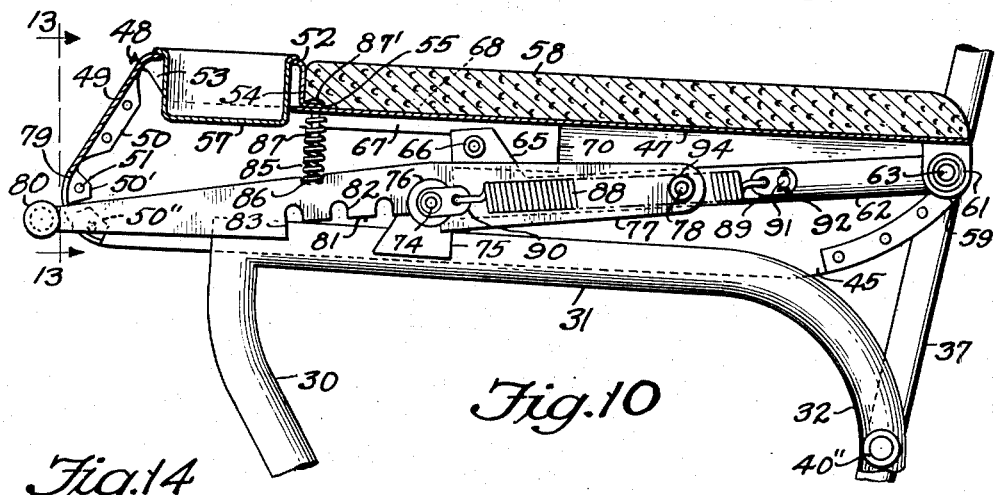
Fig. 10
Fig. 14
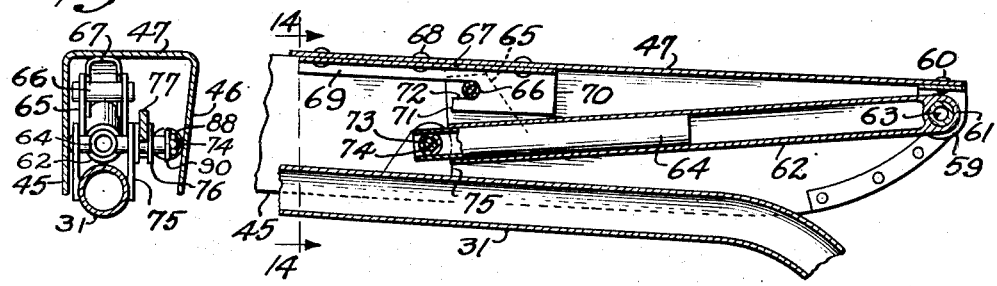
Fig. 11
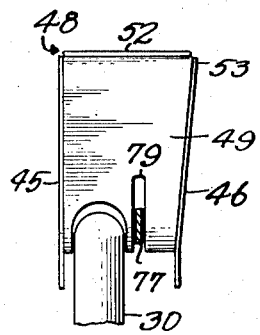
Fig. 13
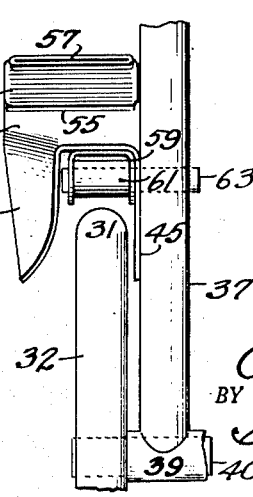
Fig. 12
INVENTOR.
GORDON K. JONES
BY Sellers and Latta
—ATTORNEYS—

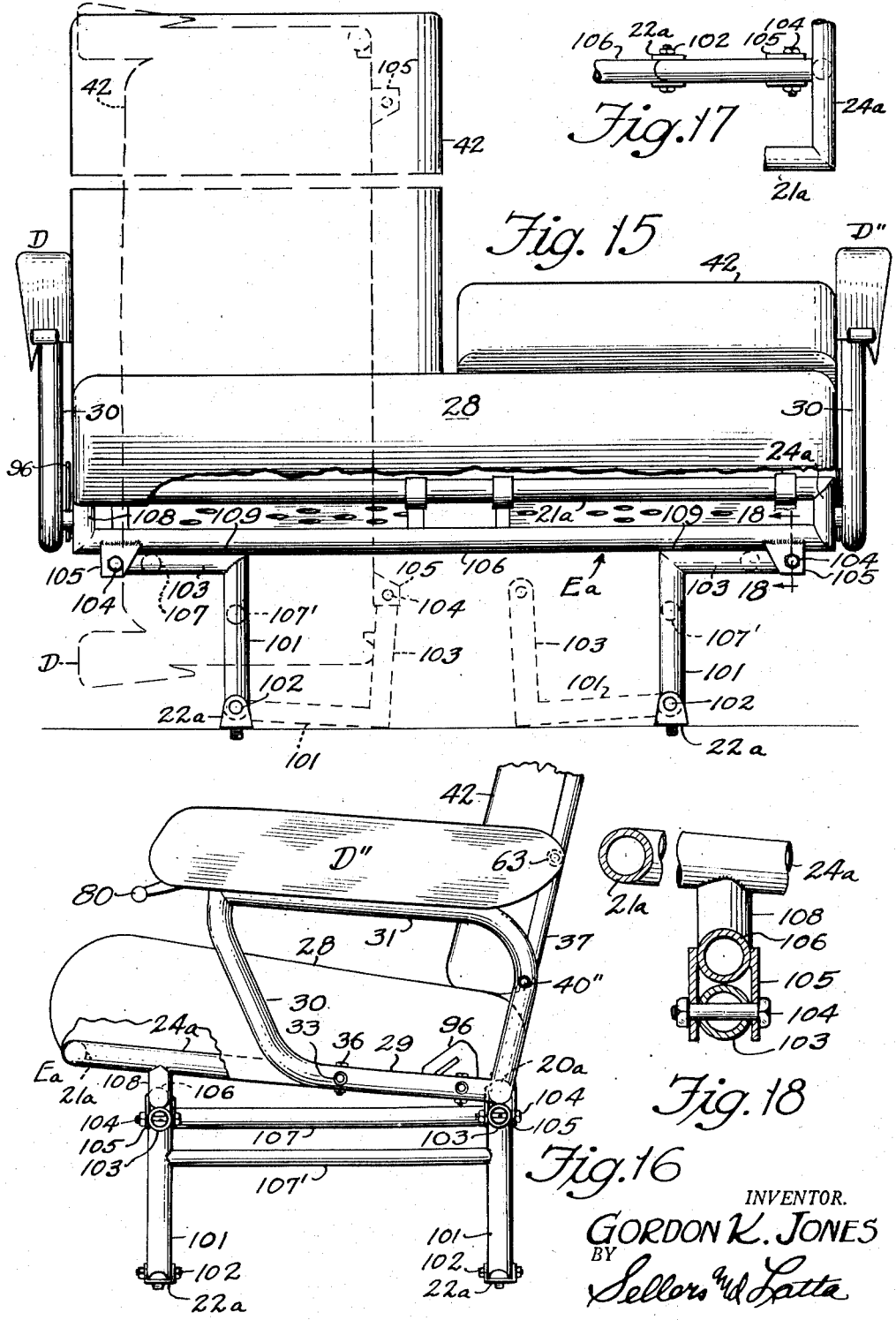

Patented May 12, 1953

2,638,151

UNITED STATES PATENT OFFICE 2,638,151

SEAT FOR VEHICLES SUCH AS AIRCRAFT

Gordon Karl Jones, Tujunga, Calif.

Application April 17, 1950, Serial No. 158,471

5 Claims. (Cl. 155—159)

This invention relates to vehicle seats. It is particularly directed to light weight vehicle seats adaptable for use in aircraft. An object of the invention is to provide a seat embodying a frame structure having greater strength per unit of weight than is provided in any prior seat structure. As to this feature, the invention is particularly directed to an improved forward leg structure of Y design.

Another object is to provide, in a vehicle seat, an improved combination arm rest and reclining mechanism which affords smoother and safer action as well as mechanical simplicity. A particular object is to provide an improved reclining mechanism which is incorporated directly in an arm rest. Specifically, the invention contemplates a reclining mechanism including resilient means for yieldingly urging the seat back forwardly, latching mechanism to hold the seat back in any selected reclining position, and telescoping guide means on which the latching mechanism is carried, all enclosed within an arm rest. A further object is to provide a vehicle seat having an arm rest including a frame structure in the form of a shell which serves the added function of providing a casing for reclining mechanism. Another object is to provide an improved arrangement of ash tray in a vehicle seat arm rest.

A further object is to provide an improved means for attaching a third seat to a pair of seats constructed in unit formation, whereby to provide, in a passenger aircraft cabin, an extra row of aisle seats in cases where it is desired to increase the total number of seats above the normal. A further object is to provide quickly operable means for attaching and detaching such extra seats.

A further object of the invention is to provide improved means for attaching standard double seats to an aircraft cabin fuselage and for disassembling them for storing in cases where an aircraft is to be used for the conveyance of freight instead of passengers.

Other objects will become apparent in the ensuing specifications and appended drawings in which:

Fig. 2 is an end view of the outer, or wall seat thereof;

Fig. 3 is a plan view of the outer, or wall seat of the assembly;

Fig. 4 is a detail sectional view taken as indicated generally by the line 4—4 of Fig. 1;

Fig. 5 is a detail sectional view taken on the line 5—5 of Fig. 2;

Fig. 6 is a detail sectional view taken on the line 6—6 of Fig. 1;

Fig. 7 is a detail sectional view taken on the line 7—7 of Fig. 3;

Fig. 8 is a detail sectional view taken on the line 8—8 of Fig. 7;

Fig. 9 is a plan view of one of the combination reclining mechanism and arm rest units with a portion of the arm rest shell broken away and shown in section to better illustrate the internal mechanism;

Fig. 10 is a vertical longitudinal sectional view thereof taken on the line 10—10 of Fig. 9;

Fig. 11 is a vertical longitudinal sectional view thereof taken on the line 11—11 of Fig. 9;

Fig. 12 is a rear end view of the same;

Fig. 13 is a front end view of the same;

Fig. 14 is a vertical transverse sectional view of the same taken on the line 14—14 of Fig. 11;

Fig. 15 is a front view of a seat embodying a modified form of the invention, the seat being shown by broken lines in a stored position;

Fig. 16 is an end view of the seat of Fig. 15;

Fig. 17 is a plan view of one corner of the seat of Fig. 15; and

Fig. 18 is a detail sectional view taken on the line 18—18 of Fig. 15.

Figure 1:
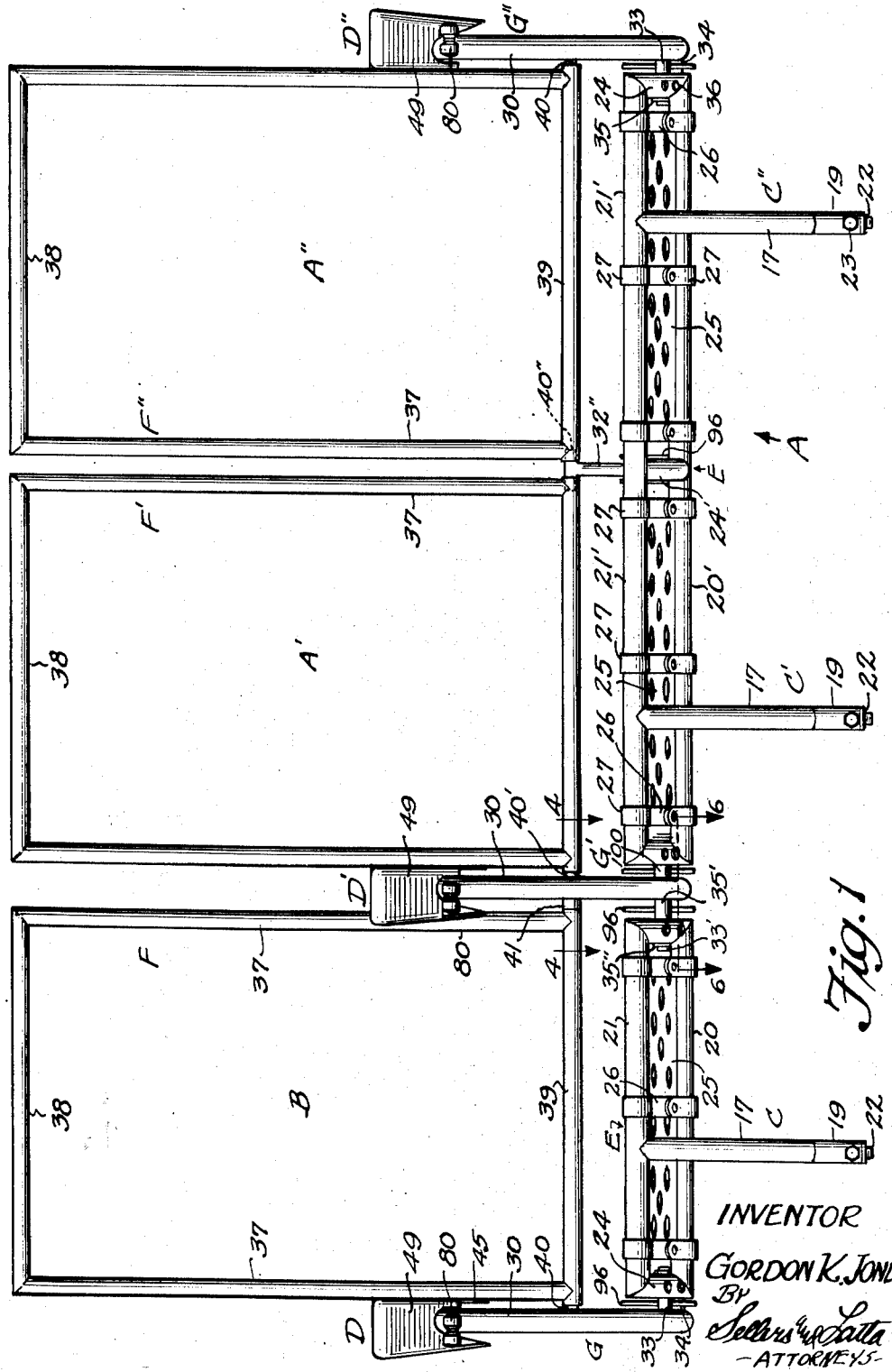
Fig. 1 is a front view of the frame structure of a three seat assembly embodying my invention.

Referring now to the drawings in detail, I have shown in Fig. 1 a double seat unit A and, attached thereto, an auxiliary seat B, both embodying the features of my invention. The double seat unit A includes an aisle seat A' which, when auxiliary seat B is attached, becomes an intermediate seat, and a wall seat A''. The three seats are supported respectively upon leg units C, C', C'', and are provided with arm rests D, D', and D''. Arm rest D'' and leg C'' are left hand units and arm rests D and D' and legs C, C' are right hand units respectively. Aside from this left- and right-hand relationship, the arm rest and leg units are substantially identical.

Double seat unit A embodies a seat bottom frame E' and auxiliary seat B embodies a seat bottom frame E. Each of the three seats includes a back frame, indicated generally by the reference character F. The arm rests D, D', D'' are supported respectively upon side frames G, G' and G''. The back frames F are pivotally connected at their lower ends to side frames G, G' and G''.

Leg structure

The leg structure is shown in Figs. 1 and 2. Each of the leg units C, C', C'' includes a vertical rear leg 16 and a Y-shaped forward leg having a forward arm 17, a rear arm 18 and a short vertical foot member 19. Each of the parts 16, 17, 18, 19 are of light weight, high strength construction preferably of metal tube section, welded together to join the lower ends of arms 17 and 18 to the upper end of foot member 19. The rear ends of arms 18 and the upper ends of legs 16 are each welded to a transverse horizontal frame bar constituting the rear member of a seat bottom frame. In the double seat bottom frame E', this bar is a bar 20' extending the width of the double seat, and for the single seat bottom E, it is a short bar 20. The upper ends of arms 17 are welded to corresponding forward transverse bars 21, 21' of the respective seat frames, whereby each pair of arms 17, 18 forms, together with a corresponding seat frame, a closed triangular structure.

The lower ends of foot members 19 and rear legs 16 are provided with threaded stud fittings 22 adapted to be threaded into frame members of the floor of a vehicle and to subsequently be connected to the respective members 16, 19 by means of bolts 23 passed therethrough. The upper portions of said members 22 fit within the lower portions of legs 16, 19.

Arms 18 bear a small portion of the vertical load but function primarily as bracing members, resisting the fore and aft loads set up by acceleration and deceleration of the vehicle and the opposing inertia of the bodies of persons seated in the seats, and the heavier fore and aft loads set up in the event of a crash. I find that my improved seat structure is considerably more resistant to being torn loose from its anchorage to the floor of the vehicle in the event of a crash than is true of conventional seats, and yet the weight of the leg structure is materially reduced as compared to conventional seats. The arms 18 attain their greatest horizontal load bearing capacity in resisting loads acting forwardly against the seat. Arms 17 are primarily vertical load carrying arms. Arms 17, by their rearward and downward inclination, function secondarily to resist loads acting rearwardly against the seat, as during acceleration of an aircraft in the take-off stage. Such loads cannot attain the magnitudes of crash loads, and thus the inclination from the vertical may be much less than in the braces 18. The arms 17 derive their primary function as vertical load bearing members from the fact that their angle of inclination relative to the floor level approaches more nearly the vertical than the horizontal (nearly 60 degrees), while the arms 18 provide their primary function as fore and aft load bearing braces from the fact that their angle of inclination relative to the floor level approaches more nearly to the horizontal than to the vertical being, in fact, in the neighborhood of approximately 30 degrees.

An important characteristic of the invention, in the attainment of minimum weight combined with maximum strength in the leg structure, is the utilization of but a single leg unit for each seat. The double seat unit A is adequately balanced above leg units C' and C'' by locating these leg units outwardly of the transverse centers of the respective seats. At the same time, the tendency of seat frame A' to bow downwardly under the load applied to its central region is reduced by locating the leg units C', C'' inwardly of the outer extremities of the respective seats of units A. I find that optimum results are obtained by locating the leg units C', C'' between ⅔ and ½ of the distance from the center of double frame A' to the outer extremities thereof. Correspondingly, leg unit C of the auxiliary seat B is located outwardly of the midpoint between the sides of frame E, with optimum results being secured by locating it between ⅔ and ½ of the distance from that side of seat B which joins seat B to the aisle side of the seat unit A. It may now be noted that with the auxiliary seat B joined to the double seat A, the legs C, C', C'' are spaced approximately equal distances apart, whereby the load of the three seats is equalized over the three legs, and that when the auxiliary seat B is detached from double unit A, the load of the two seats is equalized over leg units C', C''.

*Seat bottom and back frame structure*

The seat bottom and back frame structures are shown in Figs. 1–8. Seat bottom frames E and E' include the transverse bars 20, 20', 21, 21', together with fore-aft side frame members 24, the respective ends of which are welded to the ends of the transverse bars 20, 20', 21, 21' to define the corners of the respective frames. In the case of double seat frame E', an intermediate fore-aft frame member 24' is welded to intermediate parts of transverse members 20', 21', to divide the frame E' into two individual seat frames. Each of the three seat frames is provided with a cushion supporting seat bottom web 25, which may be of apertured sheet metal as shown in Fig. 3, suspended upon three straps 26 carried by transverse frame members 20, 21, 20', 21'. The respective ends of straps 26 are bolted to loops 27 which are looped around the respective transverse frame members 20, 20', 21, 21'. Mounted on bottom webs 25 are cushions 28 (Fig. 2).

Side frame members G, G', G'' each include a general J-shaped lower member including a horizontal bar 29 and an upwardly and forwardly inclined post 30, the parts 29 and 30 being formed by bending from a single length of tubing. Each of these side frames also includes an upper section consisting in a horizontal bar 31 welded at its forward end to a respective post 30, and a downwardly extending post 32, welded at its lower end to the rear end of bar 29, members 31 and 32 being formed by bending from a single length of tubing.

One of the important features of my invention is the use of sleeves and tubular bosses to provide quickly detachable connections between side frames G, G', G'' and seat bottom frames E, E'. These connections include coupling sleeves 33, 33' and 34, 34' each (Fig. 5) having one end portion passed through registering openings in a respective lower horizontal bar 29 of a respective side frame G, G' or G'', and welded thereto, and having an opposite end portion telescoped into a tubular boss 35, mounted in a fore-aft member 24 of a respective seat frame E or E'. Coupling sleeves 33 and 34 are just long enough to extend through members 24 and 29, while coupling sleeves 33' and 34' are somewhat longer, extending from seat frame E, through side frame G, and partially into seat frame E'. Coupling sleeves 33 and 34 are detachably received in tubular bosses 35 in member 29 of side frame G, and are secured by bolts 36 passed downwardly through frame members 24, bosses 35 and these sleeves. Coupling sleeves 33' and 34' are detachably received in tubular bosses 35' which are welded into member 29 of side frame G' and project therefrom into tubular bosses 35''. Tubular bosses 35'' are welded into member 24 of seat frame E'. Sleeves 33', 34', and 35' are secured by bolts 36 passed downwardly through frame members 24 of seat frame E', through bosses 35" and through the sleeves 33' and 34' respectively. Bosses 35, 35', and 35" are mounted in registering openings in opposite side walls of frame members 24 and are welded thereto as indicated. Spacer collars 100 are interposed between seat frame E' and side frame G' on sleeves 33', 34', to maintain proper spacing of these frames. It may now be noted that by removing bolts 36, it is possible to detach side frames G and G' from seat frames E and E' respectively, and to detach seat frame E from side frame G'. In removing a single seat, side frame G' is left in place and bolts 36 are reinserted through bosses 35" and 35' to again secure side frame G' to seat frame E' (see Fig. 6).

Seat back frames F are identical, each comprising a pair of spaced parallel upright members 37, a top bar 38 welded to the upper ends of members 37, and a bottom bar 39 to which the lower ends of members 37 are welded, with the ends of bar 39 open.

Hinged connections between the lower ends of seat frames F and side frames G, G', and G" are provided by tubular trunnions 40, 40', 40" and an adapter 41. Trunnions 40 (Fig. 5) are each mounted at one end in a respective side frame G, G" and project inwardly so as to have their other ends received within the open ends of tubular bottom bar 39 of the seats A" and B. Trunnions 40 are mounted in registering openings in the respective side walls of the rear posts 32 of frames G, G", and are welded thereto. Trunnion 40" (Fig. 3) is welded to the upper end of an auxiliary post 32" the lower end of which is secured to seat frame A' at the junction between longitudinal member 24' and rear transverse member 20'. Trunnion 40" is a double trunnion, having end portions projecting in both directions from post 32" and received in the adjacent ends of bottom bars 39 of the two seat back of double seat unit A.

The hinge trunnion 40' (Fig. 4), by means of which the back of seat A' is hinged to side frame G', is welded in frame G' the same as the mounting of trunnion 40 in side frame G. When the auxiliary aisle seat B is attached, adapter 41 is used to provide a hinged connection between the back of seat B and frame F'. Adapter 41 embodies a thick walled tubular part 41a which provides a trunnion, receivable in the end of member 39 of the auxiliary seat back, an enlarged central spacer collar 41b to bridge the space between the auxiliary seat back and the side frame G', and a reduced nipple 41c which is receivable snugly within tubular trunnion 40'.

Post 32" is braced by a gusset 95 (Fig. 7) of inverted channel section, the arms of which embrace and are welded to post 32" and seat frame member 24 respectively.

Safety belt fittings 96 are pivotally attached to the respective sides of each seat frame, those between seats A" and A' being mounted (Fig. 8) on flanged adapter collars 97 which in turn are mounted on a bolt 98 extending through the respective side arms of gusset 95. The remaining fittings 96 are mounted on respective coupling sleeves 34 between frame members 24 and 29 (Fig. 5).

Any suitable webbing such as for example, the perforated sheet metal webbing the the seat bottoms 25, may be attached to the respective seat back frames to traverse the space within the peripheries thereof, and suitable cushions 42 (Fig. 2) of any conventional type may be attached to the seat back frames, with suitable upholstering coverings, to complete the seat back structures. The same is true of seat cushions 28, which may be covered in any desired manner. Also, side frames G, G', G" may be covered by fabric envelopes (not shown). Since such details form no part of the present invention, they have not been illustrated in detail.

It may now be noted that the attachment of the side frames G, G', G" to the seat bottom frames E, E', by means of the tubular sleeves 34, 34' received in the tubular bosses 35 in seat bottom frames E, E', secured by bolts 36, serves to hold the entire frame assembly together and that there is no attachment between trunnions 40, 40', 40" and the seat back frame members 39.

When coupling sleeves 34, 34', 33, 33' are detached from the respective seat bottom frames by the removal of bolts 36, the sleeves and the trunnions 40, 40', 40" may be slipped out of their respective sockets by simply pulling the side frames G, G', G" away from the seat bottom and back structure. The invention thus provides a very simple and quickly operable means for (a) attaching the side frame members G, G', G" of the double seat unit A to the seat bottom E' thereof and providing hinged connections for the lower ends of the seat back frame of this unit; (b) when a third seat is desired, similarly attaching the third seat to the double seat unit and providing a hinged connection for the third seat.

*Arm rest and reclining mechanism*

The arm rest and reclining mechanism is shown in Figs. 9–14. Each of the arm rests D, D', D" include a shell of formed sheet metal, shaped generally as an inverted channel. Said shell has inner and outer side walls 45 and 46, connected at their upper extremities by a generally horizontal web 47. Side walls 45, 46 project forwardly beyond the forward extremity of web 47, providing a space over which is mounted a forward end cap 48. End cap 48 includes a forward wall portion 49 having at the respective side extremities thereof, flanges 50, 50', 50" which are secured as by means of rivets 51 to side walls 45, 46. End cap 48 also includes the top member 52 having, at its respective sides, aprons 53 bent downwardly to meet side walls 45, 46 respectively, and having at its rear extremity a downwardly bent shoulder member 54 terminating in a tab 55 which is secured to web 47 as by means of rivets 56. Top member 52 is apertured to receive an ash tray 57. A cushion 58, which may be of foam rubber or equivalent material, is adhesively secured to the upper face of web 47 with its forward end abutting against shoulder 54. The arm rest may be finished with a suitable fabric covering extending over cushion 58, over end cap 48 and down around side walls 45, 46, with a suitable aperture to receive ash tray 57.

The lower side of the arm rest is open to receive the corresponding side frame member G, G', or G". The rear end of the shell is provided with a bracket 59 of yoke shape, the web thereof being secured as by rivets 60 to the under side of web 47 and the downwardly projecting side arms thereof being apertured to receive a pair of trunnion members constituting the respective end portions of a sleeve 61 that is welded to one end of a guide tube 62 forming part of the reclining mechanism. Journalled in sleeve 61 is one end of a pivot pin 63 the other end of which is mounted in and welded to an upright frame member 37 of a corresponding seat back frame F. Thus both the arm rest shell and the guide tube 62 are pivoted, upon a common pivot, to the seat back frame.

The end of guide tube 62 opposite trunnion 61 is open and receives a companion guide tube 64 which is telescoped therein for sliding movement. The open end of guide tube 62 is attached to the intermediate portion of a seat rest shell by bracket means comprising a pair of ears 65 the lower ends of which are welded to the respective sides of the tube 62 and the upper ends of which are connected by a sleeve pin 66 welded thereto at its respective ends. A bracket 67 of elongated, inverted channel form is secured as by means of rivets 68 to web 47. Bracket 67 has depending side portions including relatively narrow flanges 69 and, at one end thereof, arms 70 projecting below flanges 69 and including forwardly projecting fingers 71 which, with flanges 69, define notches 72. Sleeve 66 is engaged in notches 72, whereby to support the forward end of guide tube 62 in spaced relation to web 47. With the rear end of guide tube 62 attached to yoke 59, pin 66 is securely held in notches 72, with fingers 71 supporting the forward end of tube 62. This arrangement provides an easily assembled and disassembled means for suspending the tube 62 inside the shell, the detachment of the rear end of the tube 62 from pivot yoke 59 making it possible to shift the tube forwardly until sleeve 66 slips out of notches 72.

The forward end of tubular shaft 64 is provided with a bushing 73 passed transversely therethrough and welded in place. A clevis bolt 74, extended through bushing 73 and through a pair of laterally spaced ears 75 secured to and projecting upwardly from the upper member 31 of a respective side frame, provides a pivotal connection between the forward end of shaft 64 and the side frame. Bushing 73 is received between the ears 75. Clevis bolt 74 has one end projecting beyond the adjacent ear 75. Adjacent the last mentioned ear there is rotatably mounted upon bolt 74 a flanged roller 76. An operating lever 77 has its mid-portion embraced by the flanges of roller 76, has its rear end pivoted on a trunnion 78 projecting laterally from the midportion of guide tube 62, and has its forward end projecting from the forward end of the shell through a slot 79 in the lower extremity of wall portion 49 of end cap 48. The forward end of lever 77 is provided with a handle 80. In the lower side of lever 77, in the midportion thereof, is a wide shallow notch 81, the bottom of which is indented with a series of spaced notches 82 of a proper diameter to receive the central body portion of roller 76. The ends of notch 81 are defined by shoulders 83, of sufficient depth to avoid being cleared by roller 76 when lever 77 has been raised to its upper limit of movement. This upper limit of movement is determined by the engagement of the forward end of the lever against wall 49 at the upper extremity of notch 79. A spring 85 urges lever 77 downwardly. The lower end of spring 85 is piloted on a teat defined between two spaced notches 86 in the upper edge of lever 77. The upper end of spring 85 is piloted on a pin 87 which is secured to web 47 by a screw 87'.

It may be noted that with roller 76 engaged in one of the notches 82, the seat back will be locked against movement relative to the side frames. By raising the lever 77 until the roller 76 clears the notches 82, it becomes possible for the seat back to be adjusted. The seat back is urged forwardly by a coil spring 88 the respective ends of which are hooked into short links 89, 90. Link 89 has an aperture which receives a pin 91 anchored in and projecting from guide tube 62 rearwardly of boss 78, and is secured thereon by a cotter pin 92 passed through the end of pin 91. Link 90 has a similar opening receiving the outer end of clevis bolt 74, link 90 being properly spaced from roller 76 by means of a collar 93 interposed between link 90 and roller 76.

In the operation of the reclining mechanism, the occupant of the seat simply lifts the lever 80 and adjusts his back to the desired position of inclination. If he wishes the back to assume a more upright position, he leans forwardly, allowing the forward pull of spring 88 to swing the back forwardly around the hinge pivots 40, etc. The forward movement of the back will be accompanied by a contracting telescoping movement of guide tube 62 upon shaft 64, and a corresponding forward movement of lever 77 relative to roller 76. By allowing the lever 80 to yield downwardly under spring 85, the lever will lock itself when the roller 76 finds a notch 82 to receive it. If the chair occupant desires to move the seat back rearwardly, he simply lifts the lever 77 and leans against the seat back, overcoming the pull of spring 88.

It may now be noted that in the reclining operation, the arm rest, the lever 77 and the tube 62 all move in unison with the movement of the seat back, the arcuate movement of pivot 63 as it swings about hinge axis 40, etc., being accompanied by a slight rocking movement of the arm rest and the telescoping guide member 62, 64, with reference to the side frame. Such rocking movement is accommodated by the pivotal connection between the forward end of shaft 64 and clevis bolt 74.

The limits of reclining movement are determined by the engagement of shoulders 83 against roller 76. Since it is not possible to lift the lever 77 to a sufficient height to cause shoulders 83 to clear roller 76, shoulders 83 will always engage roller 76 to stop the reclining movement at its respective limits.

The side frames may, if desired, be covered with fabric and padded with cushioning material in order to make the seat more comfortable. Alternatively, they may be left uncovered in order to minimize the weight of the seat. The upper bars 31 of side frames are largely concealed beneath the arm rest units, being embraced between the side walls 45, 46 thereof. The width of the arm rest shell is just sufficient to provide ample room for the telescoping guide assembly 62, 64, the lever 77 and the spring 88, abreast.

The pivotal connection between the rear end of lever 77 and boss 78 is provided by a bushing 94 in the rear end of lever 77, bushing 94 being simply slipped over trunnion 78. The rear end of the lever is restrained against lateral displacement of the bushing 94 from trunnion 78 by the yielding lateral pressure of spring 88 against the lever, the lateral spacing of the parts being such that the spring is maintained in contact with the side of the lever. This simplifies both construction and assembly.

*Modified form*

In the modified form of the invention shown in Figs. 15 and 16, the side frame, arm rest, back and reclining mechanisms are the same as in the previously described form of the invention. The leg structure is modified for the purpose of providing for the folding of the double seat units against the side wall of an airplane fuselage in stored or non-use positions, where the airplane is to be used for freight transportation.

Instead of the leg structures previously described, this modified form of the invention utilizes, for each double seat unit, a pair of hinged leg units which, viewed from the front as in Fig. 15, are of inverted L-shape, each including vertical legs 101 pivoted at 102 to a floor bracket 22a, and each including horizontal arms 103 welded to and projecting outwardly from the upper end of vertical legs 101. Each of the leg units has its vertical legs 101 connected by fore-aft connecting rail 107' and each pair of the horizontal arms 103 is joined by a fore-aft rail 107.

Seat frame Ea comprises the transverse rail 106, a forward upper transverse rail 21a, and a rear transverse rail 20a, rails 21a, 20a being connected by fore-aft rails 24a. Lower forward transverse rail 106 is connected at its respective ends to rails 24a, somewhat rearwardly of forward upper rail 21a, by means of short vertical posts 108. The parts just described are all welded together to provide a seat frame having the transverse rails 106 and 20a lying in substantially a common horizontal plane and the rails 21a, 20a, 24a defining a frame slanted upwardly and forwardly. Rails 106 and 20a are each provided at their respective ends with pairs of spaced ears 105 projecting downwardly and receiving the outer ends of horizontal arms 103 of the leg units, and pivoted thereto by pivots 104. The inner ends of horizontal arms 103, where they are joined to legs 101, provide heels 109 upon which transverse seat rails 106 and 20a are supported. It may now be noted that since leg units 101 have their respective arms 103 extending in opposite directions, that the engagement of rails 106 and 20a against heels 109 functions to rigidify the assembly so as to prevent any lateral swaying of the seat or any pivotal movement about pivots 102, 104. However, by removing bolts 104 at the aisle side of the seat, it is possible, by pulling the seat in the aisle direction, to pivot the other leg unit in the aisle direction, from its position shown in full lines to its position shown in dotted lines in Fig. 15. In the latter position, this leg rest unit will be supported with its legs 101 resting horizontally against the floor of the aircraft and with its arms 103 projecting upwardly. Pivots 104 will then be spaced outwardly from the side wall of the fuselage to a sufficient extent to allow the seat to be swung upwardly to its dotted line position in which the depth of the arm rest and side frame is accommodated between leg unit arms 103 and the vertical wall of the fuselage. Thus the seat is compactly stowed against the fuselage wall with little space between the seat and the wall. To restore the seat to an operative position, it is only necessary to swing the seat downwardly about pivots 104 then to lift upwardly on the side of the seat which is attached to the leg unit, bringing the outer leg unit back to the full line position, and to then raise the aisle leg unit to its operative position and attach it to the seat frame by means of bolts 104.

I claim:

1. In a reclining seat structure, a seat bottom, side frames secured to and extending upwardly from the respective sides of said seat bottom, each of said side frames having an upper generally horizontal member, a seat back having a lower corner hingedly connected to a respective side frame, and a combined arm rest and reclining mechanism comprising a shell of inverted channel shape including side wall members at least partially embracing said upper side frame member, said shell being pivotally connected at its rear extremity to said back frame, a pair of telescoping guide members one of which is attached at its respective ends to said shell and the other of which is attached at its forward end to said upper side frame member, means yieldingly urging said telescoping members into telescoping relation and thereby urging said back frame forwardly with reference to said side frame, and a lever pivotally attached at its rear end to said first mentioned telescoping member and projecting forwardly from said arm rest at its forward end, said lever having in its intermediate portion, means cooperating with the connection between said other telescoping member and said upper side frame member to latch said arm rest in various positions of adjustment relative to said side frame member.

2. In a reclining seat structure, a seat bottom frame, a side frame attached to and extending upwardly from a side of said seat bottom frame, a reclining back frame having a lower corner pivotally connected to said side frame, said side frame having an upper, generally horizontal frame member, a combined arm rest and reclining mechanism including a shell portion of inverted channel shape having side walls at least partially embracing said upper side frame member, the rear extremity of said shell being pivotally connected to said back frame above the hinged connection of the latter to said side frame, a pair of telescoping links one of which has its rear extremity pivotally connected to said back frame and the other of which has its forward extremity pivotally connected to said upper side frame member, means yieldingly acting between said back frame and said side frame for urging the back frame forwardly, means providing a connection between a forward portion of said first mentioned telescoping link and said shell for supporting the forward portion of said arm rest for movement in unison with said first mentioned link, and a lever pivotally connected at its rear extremity to said first mentioned link and having its forward extremity projecting from said arm rest for engagement by an operator, and means providing a selective latching connection between an intermediate portion of said lever and said upper side frame member in a series of selected positions of forward and rear adjustment of said back frame relative to said side frame.

3. A seat structure as defined in claim 2, wherein said yielding means comprises a coil spring having one end anchored to said first mentioned telescoping link and having its other end anchored to said upper side frame member, said seat structure further including a pair of ears joined to and projecting upwardly from the respective sides of said upper side frame member, a cross pin supported between said ears, a flanged roller mounted on said cross pin, and having flanges embracing the respective sides of said lever, and a link connecting said cross pin to the forward end of said coil spring.

4. In a reclining seat structure, a seat bottom, a side frame secured to and extending upwardly from said seat bottom, said side frame having a generally horizontal upper frame member and a generally upright rear frame member, a reclining seat back having a lower corner hingedly connected to said rear frame member, a combined arm rest and reclining mechanism including an inverted channel shaped shell having side walls at least partially embracing said upper side frame member, a pair of telescoping links including an outer tubular rear link, a common pivotal connection between the rear extremity of said rear link, the rear extremity of said shell and said back frame upwardly of the hinged connection of the latter to the side frame, a pair of ears extending upwardly from the respective sides of said upper side frame member and embracing the forward end of the other of said telescoping links, a cross pin extending between said ears and through the forward end of said other link providing a pivotal connection between the latter and said side frame, a lever pivotally connected at its rear end to an intermediate portion of said rear link and extending forwardly and beyond the forward end of said shell for manipulation by an operator, said lever having a plurality of downwardly opening notches in its intermediate portion, said notches being spaced longitudinally of the lever, and adapted to selectively receive said cross pin to determine a series of selective positions of adjustment between said arm rest and said side frame, and a coil spring having its forward end anchored to said cross pin and its rear end anchored to a rearward portion of said rear link, exerting a forward pull against said arm rest and back frame.

5. A seat structure as defined in claim 4, including a bracket mounted within said shell above the forward extremity of said rear link, said bracket having a forwardly opening notch therein, an ear attached to and extending upwardly from the forward extremity of said rear link, a pin mounted in said ear and received in said notch for supporting the forward portion of said arm rest upon the forward extremity of said rear link, and yielding means under compression between a forward portion of said lever and said shell, urging said lever downwardly to maintain the latch engagement thereof with said cross pin.

GORDON KARL JONES.

References Cited in the file of this patent

UNITED STATES PATENTS

| Number | Name | Date |
|---|---|---|
| 1,173,829 | Mangam | Feb. 29, 1916 |
| 1,234,267 | Bennett | July 24, 1917 |
| 1,238,913 | Hill et al. | Sept. 4, 1917 |
| 1,674,220 | Percival | June 19, 1928 |
| 1,898,448 | Hultgren | Feb. 21, 1933 |
| 2,035,452 | Bell | Mar. 31, 1936 |
| 2,066,901 | Preble | Jan. 5, 1937 |
| 2,099,460 | Bell | Nov. 17, 1937 |
| 2,133,471 | Opperman | Oct. 18, 1938 |
| 2,142,662 | Todd | Jan. 3, 1939 |
| 2,311,105 | Will | Feb. 16, 1943 |
| 2,333,073 | Mueller | Oct. 26, 1943 |
| 2,454,699 | Hirsch | Nov. 23, 1948 |
| 2,494,348 | Mersinger | Jan. 10, 1950 |